(12) United States Patent
Ye et al.

(10) Patent No.: US 11,238,602 B2
(45) Date of Patent: Feb. 1, 2022

(54) METHOD FOR ESTIMATING HIGH-QUALITY DEPTH MAPS BASED ON DEPTH PREDICTION AND ENHANCEMENT SUBNETWORKS

(71) Applicant: Dalian University of Technology, Dalian (CN)

(72) Inventors: Xinchen Ye, Liaoning (CN); Wei Zhong, Liaoning (CN); Haojie Li, Liaoning (CN); Lin Lin, Liaoning (CN); Xin Fan, Liaoning (CN); Zhongxuan Luo, Liaoning (CN)

(73) Assignee: Dalian University of Technology, Dalian (CN)

( * ) Notice: Subject to any disclaimer, the term of this patent is extended or adjusted under 35 U.S.C. 154(b) by 0 days.

(21) Appl. No.: 16/649,322

(22) PCT Filed: Jan. 7, 2019

(86) PCT No.: PCT/CN2019/070590
§ 371 (c)(1),
(2) Date: Mar. 20, 2020

(87) PCT Pub. No.: WO2019/174378
PCT Pub. Date: Sep. 19, 2019

(65) Prior Publication Data
US 2020/0265597 A1    Aug. 20, 2020

(30) Foreign Application Priority Data
Mar. 14, 2018  (CN) .......................... 201810207285.4

(51) Int. Cl.
*G06K 9/00*  (2006.01)
*G06T 7/55*  (2017.01)

(52) U.S. Cl.
CPC ...... *G06T 7/55* (2017.01); *G06T 2207/10024* (2013.01); *G06T 2207/10028* (2013.01);
(Continued)

(58) Field of Classification Search
CPC ............ G06T 7/55; G06T 2207/10024; G06T 2207/10028; G06T 2207/20081; G06T 2207/20084
(Continued)

(56) References Cited

U.S. PATENT DOCUMENTS 10,646,156 B1 * 5/2020 Schnorr ............... G06N 3/0454

FOREIGN PATENT DOCUMENTS

CN     106157307 A    11/2016
CN     107578436 A     1/2018
(Continued)

OTHER PUBLICATIONS

Yu, Fisher, Vladlen Koltun, and Thomas Funkhouser. "Dilated residual networks." Proceedings of the IEEE conference on computer vision and pattern recognition. 2017. (Year: 2017).*
(Continued)

*Primary Examiner* — Jonathan S Lee
(74) *Attorney, Agent, or Firm* — Muncy, Geissler, Olds and Lowe, P.C.

(57) ABSTRACT

The present invention provides a method for estimating high-quality depth map based on depth prediction and enhancement sub-networks, belonging to the technical field of image processing and computer vision. This method constructs depth prediction subnetwork to predict depth information from color image and uses depth enhancement subnetwork to obtain high-quality depth map by recovering the low-resolution depth map. It is easy to construct the system, and can obtain the high-quality depth map from the corresponding color image directly by the well-trained end to end network. The algorithm is easy to be implemented. It uses high-frequency component of color image to help to recover the lost depth boundaries information caused by down-sampling operators in depth prediction sub-network,
(Continued)

and finally obtains high-quality and high-resolution depth maps. It uses spatial pyramid pooling structure to increase the accuracy of depth map prediction for multi-scale objects in the scene.

2 Claims, 1 Drawing Sheet

(52) U.S. Cl.
CPC ............... *G06T 2207/20081* (2013.01); *G06T 2207/20084* (2013.01)

(58) Field of Classification Search
USPC ........................................................ 382/154
See application file for complete search history.

(56) References Cited

FOREIGN PATENT DOCUMENTS

| | | |
|---|---|---|
| CN | 107767380 A | 3/2018 |
| CN | 108510535 A | 9/2018 |

OTHER PUBLICATIONS

Mehta, Sachin, et al. "Espnet: Efficient spatial pyramid of dilated convolutions for semantic segmentation." Proceedings of the european conference on computer vision (ECCV). 2018. (Year: 2018).*
Sarker, Md Mostafa Kamal, et al. "SLSDeep: Skin lesion segmentation based on dilated residual and pyramid pooling networks." International Conference on Medical Image Computing and Computer-Assisted Intervention. Springer, Cham, 2018. (Year: 2018).*
Fu, Huan, et al. "A compromise principle in deep monocular depth estimation." arXiv preprint arXiv: 1708.08267 (2017). (Year: 2017).*
Duan, Xiangyue, et al. "High quality depth estimation from monocular images based on depth prediction and enhancement sub-networks." 2018 IEEE international conference on multimedia and expo (ICME). IEEE, 2018. (Year: 2018).*
Duc My Vo et al., 'Semantic image segmentation using fully convolutional neural networks with multi-scale images and multi-scale dilated convolutions', Multimed Tools Appl (2018) 77:vol. 77, No. 14, Feb. 22, 2018, p. 18689-18707.
Fisher Yu et al., "Multi-Scale Context Aggregation By Dilated Convolutions", ICLR 2016, Apr. 30, 2016, pp. 1-13.

* cited by examiner

METHOD FOR ESTIMATING HIGH-QUALITY DEPTH MAPS BASED ON DEPTH PREDICTION AND ENHANCEMENT SUBNETWORKS

TECHNICAL FIELD

The present invention belongs to the technical filed of image processing of computer vision, and relates to predicting the depth map by using depth prediction sub-network from color image and restoring the resolution of the depth map by using depth enhancement sub-network form the low resolution depth map and then getting the high resolution predicted depth map. Specifically, it relates to a method for predicting high-quality depth map based on depth prediction and depth enhancement sub-networks.

BACKGROUND

The depth of the real scene or depth information is to measure the third dimension of the scene, which is widely used in various tasks in computer vision, like pose estimation, 3D reconstruction and so on. Although high-quality texture information is easy to acquire using color camera, the acquisition of depth information is still a challenge task. In tradition, stereo matching methods or other specialized depth sensing devices are often used to acquire the depth information. Stereo matching methods use two corresponding images captured from stereo cameras to match correlation and compute depth map based on triangulation. Most other depth acquisition methods use depth sensing devices, e.g., Time-of-Flight (ToF) cameras and Microsoft Kinect, to acquire the scene depth map. These sensor-based methods can achieve relatively better results, but heavily rely on the capturing equipment.

With the development of deep learning, convolutional neural network (CNN) is used to obtain depth information from their corresponding monocular color image, which solves the disadvantage of over-dependence on depth acquisition device in traditional methods but subjects to other problems, such as low resolution predicted depth maps and low accuracy of depth prediction for multi-scale objects. In the existing convolutional neural networks, in order to obtain a larger sensor field, almost all of them contain some pooling layers and down-sampling layers, resulting in a decrease in the resolution of the obtained depth map. To increase the accuracy of depth prediction for multi-scale objects in the scene, general methods resize the color image to different scales, and predict depth map separately and then obtain the result. This can improve the performance of network, but is very time-consuming.

Based on the above problem, the present invention designs a high-quality depth estimation framework based on CNN. This framework consists of depth prediction and enhancement sub-networks. Depth prediction sub-network is constructed based on ResNet-101 (K. He, X. Zhang, S. Ren, and J. Sun, Deep residual learning for image recognition, in IEEE CVPR, 2016, pp. 770-778.), to obtain depth information from color image. Then, depth enhancement sub-network is proposed to increase the resolution of the predicted depth map from depth prediction sub-network and obtain the final high-resolution depth map.

SUMMARY

The present invention aims to overcome the deficiency of the existing technology and provides a high quality depth prediction method based on depth prediction and depth enhancement sub-networks, and designs a high-quality depth prediction framework based on convolutional neural network which includes two parts: depth prediction sub-network and depth enhancement sub-network. Depth prediction sub-network is constructed based on ResNet-101 to obtain depth information from color image. Depth enhancement sub-network is proposed to increase the resolution of the predicted depth map from depth prediction sub-network and obtain the final high-quality depth information. On this basis, the present invention uses spatial pyramid pooling structure to increase the accuracy of depth prediction for multi-scale objects. According to this, high-quality depth map can be obtained from our CNN-based depth prediction framework.

The specific technical solution of the present invention is a high-quality depth prediction method based on depth prediction sub-network and enhanced sub-network, including the following steps:

A method for estimating high-quality depth maps based on depth prediction and enhancement subnetworks, comprising the following steps:

(1) Preparing initial data, including color images and corresponding depth maps for training and testing;

(2) Constructing the depth prediction sub-network;

(2-1) Replacing the last two down-sampling layers with dilated convolution (Fisher Yu and Vladlen Koltun, Multi-scale context aggregation by dilated convolutions, CoRR, vol.abs/1511.07122, 2015) with dilation rate 2 in ResNet-101 (residue network with 101 layers), which can enlarge the receptive field without decreasing the resolution of feature map.

(2-2) Replacing the final full connected layer in ResNet-101 model with four dilated convolutions of different dilation rates to formulate a spatial pyramid pooling scheme. The dilation rates are 6,12,18,24, separately. Dilated convolution with different rates can cover objects at different scales efficiently and accurately, improving the depth predicting accuracy and the time efficiency.

(3) Constructing the depth enhancement sub-network: using progressive CNN structure to replace the common linear interpolation and up-sampling structures at the end of depth prediction sub-network to increase the depth map resolution precisely;

(4) Training the whole network composed by step (2) and step (3).

Furthermore, depth enhancement sub-network construction in step (3), comprising the following steps:

(3-1) Using high-frequency filter to extract the high-frequency component of the color image and using several convolutional layers to extract the features as one of the inputs of depth enhancement sub-network, which can help the depth enhancement sub-network to perform boundaries optimization.

(3-2) The input branch of depth map is a CNN structure comprising three same up-sampling modules, each including a convolutional layer, a standard skip structure and a deconvolutional layer. Each module up-samples the resolution of depth map at a scale of 2.

(3-3) Concatenating the above two branches together and using a convolution operation to obtain the final output depth map.

Further, (4) training the whole network composed by step (2) and step (3):

(4-1) First, training the depth prediction and enhancement sub-networks separately to obtain two individual convergent training models, respectively.

(4-2) Second, designing a training loss function to make the predicted depth map approximate the actual depth map, the formula is as follows:

$$L(\hat{d}_s, \hat{d}, d_s, d) = \sum_{i=1}^{N} \left( \left\| \hat{d}_s^{(i)} - d_s^{(i)} \right\|_2^2 + \lambda \left\| \hat{d}^{(i)} - d^{(i)} \right\|_2^2 \right)$$

in which L is denoted as the loss function, $\hat{d}_s$ is the predicted low-resolution depth map from depth prediction sub-network, $d_s$ is the actual depth map corresponding to $\hat{d}_s$, $\hat{d}$ is the predicted high-resolution depth map from depth enhancement sub-network, d is the actual depth map corresponding to $\hat{d}$, and $\lambda$ is the balance factor, valued in (0,1]. N is the count of images in every training step, i is the index of current image, valued in [1,N]. $\|\cdot\|_2$ is the L2 norm. The above formula is used to joint train depth prediction and depth enhancement sub-network, and optimize the whole network.

When the training process is finished, testing dataset can be tested through the trained model to produce the corresponding output depth maps.

The present invention has the following beneficial effects:

The present invention is designed based on CNN. It first constructs a depth prediction sub-network based on ResNet-101 to obtain a low-resolution depth map, and then constructs a depth enhancement sub-network increase the resolution of depth map and obtains the final high-quality depth map. It has the following characteristics:

1. It is easy to construct the system, and can obtain the high-quality depth map from the corresponding color image directly by the end to end network.

2. The program is simple and easy to implement.

3. It uses high-frequency component of color image to help to recover the lost information caused by down-sampling operators in depth prediction sub-network, and finally obtains high-quality and high-resolution depth maps.

4. It uses spatial pyramid pooling structure to increase the accuracy of depth map prediction for multi-scale objects in the scene.

DETAILED DESCRIPTION

Figure 1:
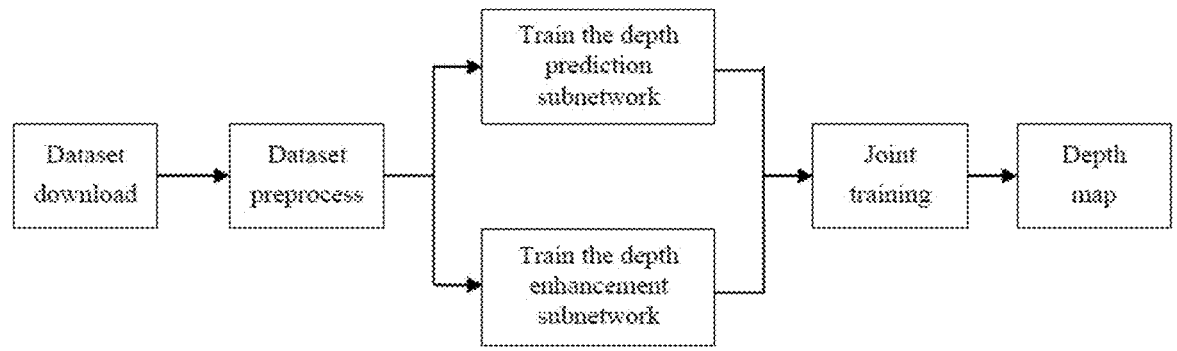
FIG. 1 is the flow chart of the method.

Specific embodiment of the present invention is further described below in combination with accompanying drawings and the technical solution:

As shown in FIG. 1, a method for estimating high-quality depth map based on depth prediction and depth enhancement sub-networks includes the following steps:

(1) Preparing initial data;

(1-1) Two public datasets are used, including indoor NYUV2 dataset and outdoor Make 3D dataset, to train and test the proposed framework.

(1-2) From indoor NYUV2 dataset, 1449 color images and corresponding depth maps from 464 scenes are chosen, and separated according to the official split in which 795 image pairs are used for training and 654 for testing.

(1-3) From outdoor Make 3D dataset, 400 image pairs are used for training and 134 for testing. Since the color image is of the size 2272×1704 while depth map is 55×305, the color image and corresponding depth map are resized to 460×345 uniformly.

(2) Constructing the depth prediction sub-network, the depth prediction sub-network is obtained based on the corresponding improvement of ResNet-101 model;

(2-1) Replacing the last two down-sampling layers with dilated convolution (Fisher Yu and Vladlen Koltun, Multi-scale context aggregation by dilated convolutions, CoRR, vol.abs/1511.07122, 2015) with dilation rate 2 in ResNet-101 (residue network with 101 layers), which can enlarge the receptive field without decreasing the resolution of feature map.

(2-2) Replacing the final full connected layer in ResNet-101 model with four dilated convolutions of different dilation rates to formulate a spatial pyramid pooling scheme. The dilation rates are 6,12,18,24, separately. Dilated convolution with different rates can cover objects at different scales efficiently and accurately, improving the depth predicting accuracy and the time efficiency.

(3) Constructing the depth enhancement sub-network: using progressive CNN structure to replace the common linear interpolation and up-sampling structures at the end of depth prediction sub-network to increase the depth map resolution precisely.

(3-1) Using high-frequency filter to extract the high-frequency component of the color image and using several convolutional layers to extract the features as one of the inputs of depth enhancement sub-network, which can help the depth enhancement sub-network to perform boundaries optimization.

(3-2) Depth map branch is a CNN structure comprising three same up-sampling modules, each including a convolutional layer, a standard skip structure and a deconvolutional layer. Each module up-samples the resolution of depth map at a scale of 2.

Figure 2:
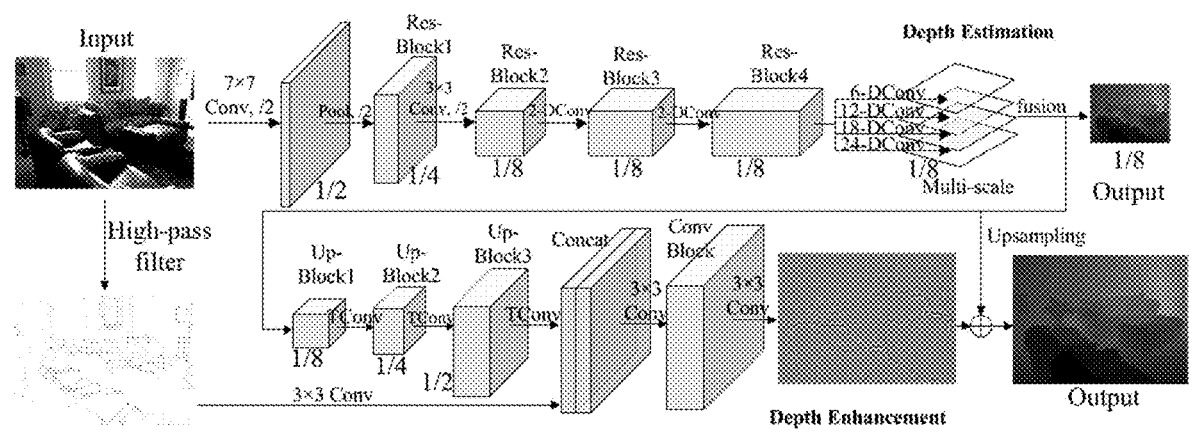
FIG. 2 is a schematic diagram of the network structure.

(3-3) Concatenating the above two branches together and using a convolution operation to obtain the final output depth map. The whole network architecture is shown in FIG. 2.

(4) Training the whole network composed by step (2) and step (3).

(4-1) First, training the depth prediction and enhancement sub-networks separately. The pre-trained ResNet-101 model is used to initialize the depth prediction sub-network and L2-norm function is used to optimize the network. For depth enhancement sub-network, the network is randomly initialized, and also L2-norm function is used to optimize the network. L2-norm loss function is defined as below:

$$L(\hat{d}, d) = \sum_{i=1}^{N} \left( \left\| \hat{d}^{(i)} - d^{(i)} \right\|_2^2 \right)$$

in which, L is denoted as the loss function, $\hat{d}$ is the high-resolution depth map obtained from depth enhancement network while d is the actual depth map corresponding to $\hat{d}$. N is the count of images in every training step, and i is the image index, valued in [1,N], $\|\cdot\|_2$ is the L2 norm.

(4-2) Second, designing a training loss function to make the predicted depth map approximate the actual depth map, the formula is as follows:

$$L(\hat{d}_s, \hat{d}, d_s, d) = \sum_{i=1}^{N} \left( \left\| \hat{d}_s^{(i)} - d_s^{(i)} \right\|_2^2 + \lambda \left\| \hat{d}^{(i)} - d^{(i)} \right\|_2^2 \right)$$

in which L is denoted as the loss function, $\hat{d}_s$ is the predicted low-resolution depth map from depth prediction sub-network, $d_s$ is the actual depth map corresponding to $\hat{d}_s$, $\hat{d}$ is the predicted high-resolution depth map from depth enhancement sub-network, d is the actual depth map corresponding to $\hat{d}$, and $\lambda$ is the balance factor, valued in (0,1]. N is the count of images in every training step, i is the index of current image, valued in [1,N]. $\|\cdot\|_2$ is the L2 norm. The above formula is used to joint train depth prediction and depth enhancement sub-network, and optimize the whole network. When training, the momentum is set to be 0.9, and the learning rate is initialized to 1e−4, and drops by 0.9 per epoch.

When the training process is finished, testing dataset can be tested through the trained model to produce the corresponding output depth maps.

Figure 3:
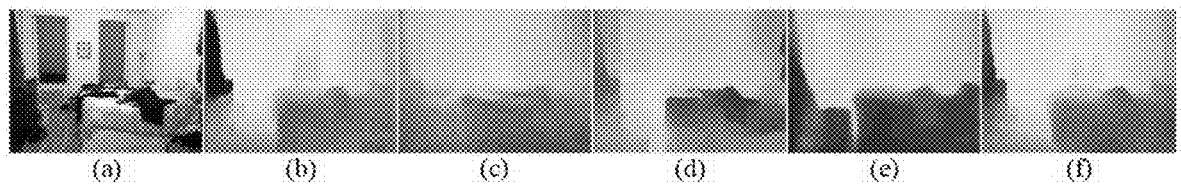
FIG. 3 is the results comparison with other methods. (a) Different color frame; (b) Ground truth depth map; (c) Results from Eigen et al. (d) Results from Liu et al. (e) Results from Laina et al; (f) Results of the present invention.

The final results of depth prediction comparisons with other methods are shown in FIG. 3. (a) Color image; (b) Ground truth depth map; (c) Results from Eigen et al (D. Eigen and R. Fergus, Predicting depth, surface normals and semantic labels with a common multi-scale convolutional architecture, in IEEE ICCV, 2015, pp. 2650-2658.). (d) Results from Liu et al (F. Liu, C. Shen, G. Lin, and I. Reid, Learning depth from single monocular images using deep convolutional neural fields, IEEE TPAMI, vol. 38, no. 10, pp. 2024-2039, 2016.). (e) Results from Laina et al (Iro Laina, Christian Rupprecht, Vasileios Belagiannis, Federico Tombari, and Nassir Navab, Deeper depth prediction with fully convolutional residual networks, in Fourth International Conference on 3d Vision, 2016, pp. 239-248.). (f) Results of the present invention.

The invention claimed is:

1. A method for estimating high-quality depth map based on depth prediction and enhancement sub-networks, wherein comprising the following steps:
   (1) preparing initial data, including color images and corresponding depth maps for training and testing;
   (2) constructing the depth prediction sub-network:
      replacing the last two down-sampling layers of ResNet-101 (residue network with 101 layers) with dilated convolution with dilation rate 2-, obtaining the preliminary depth prediction sub-network; and
      replacing the final full connected layer of the preliminary depth prediction sub-network with four dilated convolutions of different dilation rates to formulate a spatial pyramid pooling scheme; the dilation rates are 6,12,18,24, separately, obtaining the depth prediction sub-network;
   (3) constructing the depth enhancement sub-network:
      using high-frequency filter to extract the high-frequency information of the color image and using several convolutional layers to extract the features of the high-frequency information as one of the inputs of depth enhancement sub-network;
      the input branch of depth map is a CNN structure comprising three same up-sampling modules, each including a convolutional layer, a standard skip structure and a deconvolutional layer; each module up-samples the resolution of depth map at a scale of 2; and
      concatenating the above two branches together and using a convolution operation to obtain the final output depth map; obtaining the depth enhancement sub-network; and
   (4) training the whole network composed by step (2) and step (3).

2. The method for estimating high-quality depth map based on depth prediction and enhancement subnetwork according to claim 1, wherein the training process in step (4) for CNN model from step (2) and step (3) comprises the following steps:
   (4-1) first, training the depth prediction and enhancement sub-networks separately to obtain two individual convergent training models, respectively;
   (4-2) second, designing a training loss function to make the predicted depth map approximate the actual depth map, the formula is as follows:

$$L(\hat{d}_s, \hat{d}, d_s, d) = \sum_{i=1}^{N} \left( \left\| \hat{d}_s^{(i)} - d_s^{(i)} \right\|_2^2 + \lambda \left\| \hat{d}^{(i)} - d^{(i)} \right\|_2^2 \right)$$

in which L is denoted as the loss function, $\hat{d}_s$ is the predicted low-resolution depth map from depth prediction sub-network, $d_s$ is the actual depth map corresponding to $\hat{d}_s$, $\hat{d}$ is the predicted high-resolution depth map from depth enhancement sub-network, d is the actual depth map corresponding to $\hat{d}$, and $\lambda$ is the balance factor, valued in (0,1]; N is the count of images in every training step, i is the index of current image, valued in [1,N]; $\|\cdot\|_2$ is the L2 norm.

* * * * *